(12) United States Patent
Lee

(10) Patent No.: US 7,893,558 B2
(45) Date of Patent: Feb. 22, 2011

(54) ON-VEHICLE POWER SUPPLY DEVICE

(75) Inventor: Yu-Lung Lee, Taipei Hsien (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 121 days.

(21) Appl. No.: 11/856,200

(22) Filed: Sep. 17, 2007

(65) Prior Publication Data

US 2009/0026837 A1    Jan. 29, 2009

(30) Foreign Application Priority Data

Jul. 27, 2007   (TW) .............................. 96127674 A

(51) Int. Cl.
*B60L 1/00*   (2006.01)
*H02J 9/00*   (2006.01)

(52) U.S. Cl. ........................ 307/10.1; 307/64
(58) Field of Classification Search .................. 307/64, 307/10.1, 150
See application file for complete search history.

(56) References Cited

U.S. PATENT DOCUMENTS

| | | | |
|---|---|---|---|
| 5,029,064 A * | 7/1991 | Ball | 363/65 |
| 6,288,916 B1 * | 9/2001 | Liu et al. | 363/37 |
| 6,479,970 B2 * | 11/2002 | Reddy | 320/162 |
| 7,218,539 B2 * | 5/2007 | Ely et al. | 363/131 |
| 7,259,476 B2 * | 8/2007 | Frey | 307/64 |
| 7,338,328 B2 * | 3/2008 | Krieger et al. | 439/668 |
| 2008/0164761 A1 * | 7/2008 | O'Bryant et al. | 307/66 |

* cited by examiner

*Primary Examiner*—Michael Rutland Wallis
(74) *Attorney, Agent, or Firm*—Rosenberg, Klein & Lee

(57) ABSTRACT

An on-vehicle power supply device is connected to a vehicle battery with revealing. The on-vehicle power supply device is used for receiving a DC input power supplied by the vehicle battery, and the on-vehicle power supply device induces a plurality of high-frequency voltages through a single isolation transformer at the same time, and then transforms the high-frequency voltages to produce at least one AC output voltage and DC output voltage. In addition, the on-vehicle power supply device further includes a rechargeable battery. The rechargeable battery can be charged when the DC input power is importing. When the DC input power stops importing, the rechargeable battery is used for supplying a backup power to the isolation transformer, and the rechargeable battery keeps producing AC output voltage and DC output voltage. Hence, the present invention can achieve the effects of multipurpose, safety, and continuity.

10 Claims, 3 Drawing Sheets

ON-VEHICLE POWER SUPPLY DEVICE

BACKGROUND OF THE INVENTION

1. Field of the Invention

The present invention relates to a power supply device, and more particularly to an on-vehicle power supply device.

2. Description of Related Art

In recent years, technological industries are developed rapidly, and electronic technologies are integrated and applied extensively in many different fields to gain competitive edges and values. As to the automobile industry, more and more automobile electronics are applied and integrated into cars each year. For example, LED related products, multimedia A/V products, monitoring devices and global positioning systems (GPS) are installed in cars. Of course, many technologies also modify their designs to support more on-vehicle electronic products, and thus this business opportunity obviously becomes one of the key factors for the development of electronics in the future.

To integrate or support the electronic peripheral devices, designers and manufacturers need to solve the issue of the on-vehicle power supply first. Since users generally obtain electric power directly from the DC power of a car battery through a cigarette lighter in a car or the AC power output (with a voltage of 110V/220V similar to that of the utility power) obtained through converting the power of the car battery by the so-called car inverter. If a user intends to use a DC electronic peripheral device through the car inverter in a car, the user needs to use an AC/DC adapter originally bundled with the DC electronic peripheral device, but such application is inconvenient and occupies space in the car.

In addition, the main issue of the prior art resides on that users cannot obtain a power supply continuously, since the car battery supplies electric power to users only when the car engine is turned on. If the car engine is turned off, the users no longer can obtain the electric power of car battery from the cigarette lighter or converted by the car inverter. As a result, the users cannot continue using the electronic peripheral device.

Finding a feasible solution for the on-vehicle power supply and providing users different voltages by a multipurpose, safe and continuous method demand further researches and improvements.

SUMMARY OF THE INVENTION

In view of the foregoing shortcoming of the prior art, the inventor of the present invention intended to simultaneously supply AC and DC power isolated from a car battery through a simple and reduced circuit design, so that an output power can isolate noises produced by a car battery when the car battery is charged, and design a plurality of DC power outputs for a flexible application. In the meantime, the present invention further designs a rechargeable battery which is charged when the car supplies electric power, and automatically forms a power supply to allow users to maintain a continuous use of an electronic peripheral device when the car does not supply electric power, so as to achieve the effects of multipurpose, safety, and continuity.

To achieve the foregoing objective, the present invention provides an on-vehicle power supply device connected to a vehicle battery, and the on-vehicle power supply device comprises: a first switch module, a rechargeable battery, a second switch module, a power controller, an isolation transformer, at least one first output unit and at least one second output unit. The first switch module is used for receiving a DC input power supplied by the vehicle battery and converting the DC input power into a first high-frequency power, and the second switch module is a two-way switch module for charging battery or converting the DC input power of the battery into a second high-frequency power. The power controller detects the DC input power to control the operations of the first switch module and the second switch module, so that only one of the first high-frequency power and the second high-frequency power outputs power at a time. The isolation transformer is electrically connected to the first switch module and the second switch module for receiving the first high-frequency power or the second high-frequency power respectively, so as to couple to the outputs of a plurality of high-frequency voltages. Finally, the first output unit and the second output unit are electrically connected to the isolation transformer for receiving a high-frequency voltage and converting the high-frequency voltage to separately output an AC output voltage and a DC output voltage. If the power controller detects an input of the DC input power, then the power controller will control the first switch module to operate and convert the DC input power into a first high-frequency power, and also controls the second switch module to switch into a charging state. If the power controller detects a stop of inputting the DC input power, then the power controller will stop controlling the first switch module and will control the second switch module to switch to a power supplying state to generate a high-frequency power.

To make it easier for our examiner to understand the innovative features and technical content, we use the following preferred embodiments together with related drawings for the detailed description of the invention, and it should be pointed out that the attached drawings are provided for reference and description only, but not for limiting the present invention.

DETAILED DESCRIPTION OF THE PREFERRED EMBODIMENTS

Figure 1:
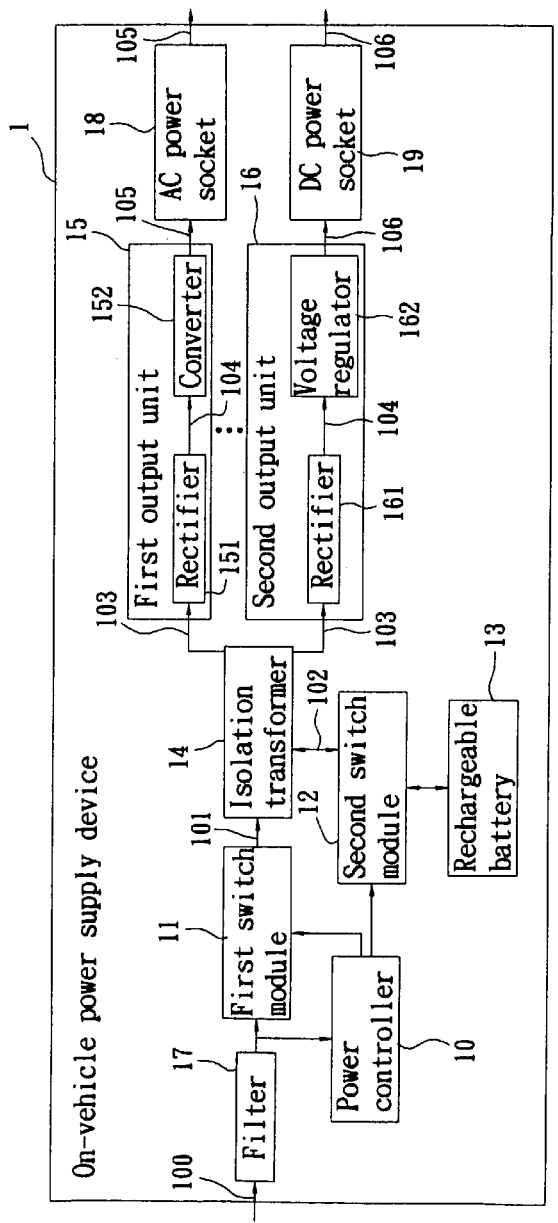
FIG. 1 is a block diagram of an on-vehicle power supply in accordance with a preferred embodiment of the present invention.
Figure 2:
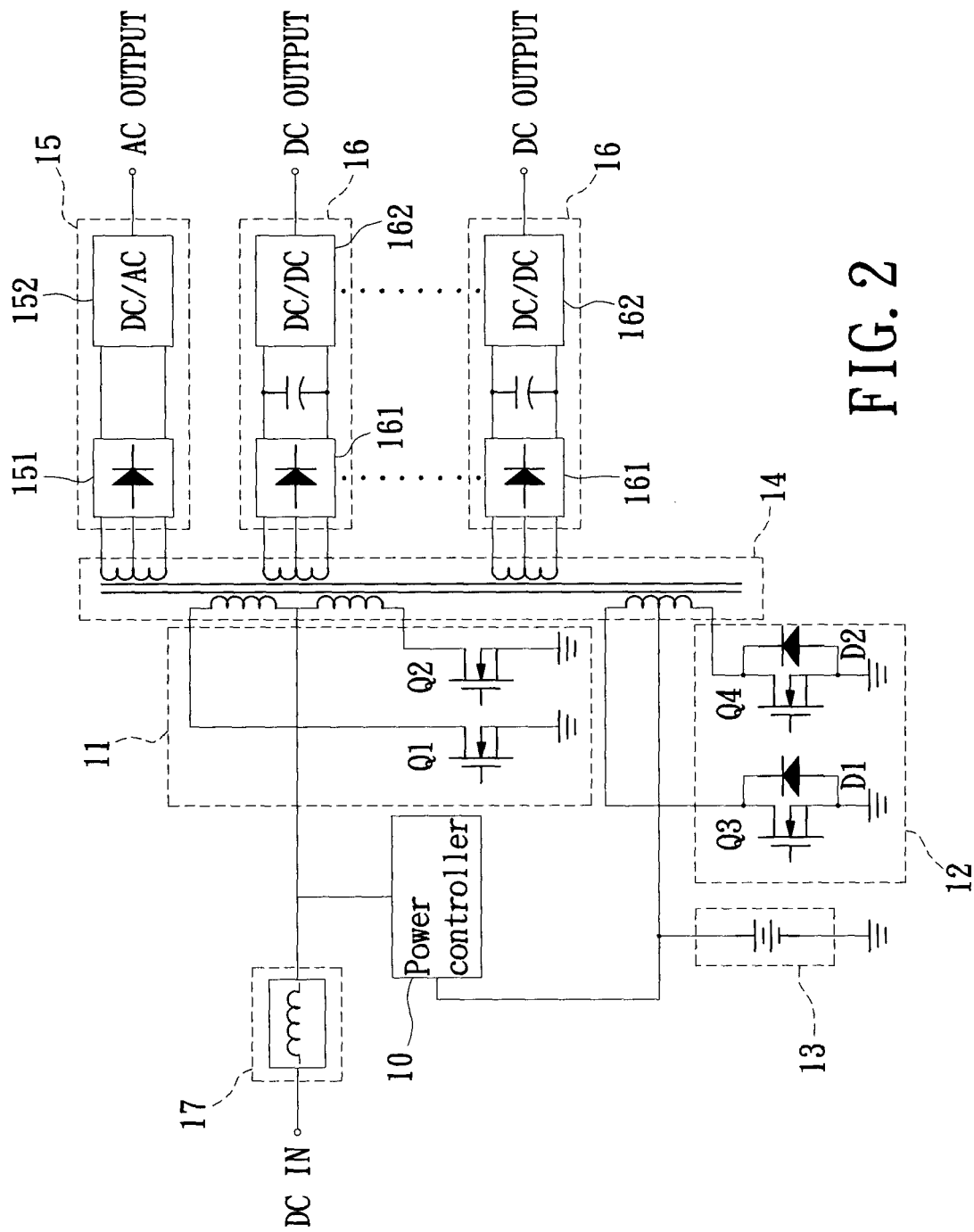
FIG. 2 is a schematic circuit diagram of an on-vehicle power supply device in accordance with the present invention.

Referring to FIGS. 1 and 2 for a block diagram and a schematic circuit diagram of an on-vehicle power supply device in accordance with the present invention, the on-vehicle power supply device 1 is installed to a vehicle by an exposing method and connected to a vehicle battery (not shown in the figure) for supplying DC power and AC power to users in a car through various designs of electric power outputs.

The on-vehicle power supply device 1 of the invention comprises: a power controller 10, a first switch module 11, a second switch module 12, a rechargeable battery 13, an isolation transformer 14, at least one first output unit 15, at least one second output unit 16, a filter 17, at least one AC power socket 18 and at least one DC power socket 19. The rechargeable battery 13 is mainly used for storing and supplying a backup power. In other words, the on-vehicle power supply device 1 not only obtains a DC input power 100 from the vehicle battery, but also obtains a backup power in the rechargeable battery 13, and thus the invention can convert a power supply anytime to supply the require power to users appropriately.

To avoid being influenced at the instant moment of starting a car engine while the on-vehicle power supply device 1 is receiving the DC input power 100 supplied by vehicle battery, manufacturers need to suppress the noises by means of a filter 17, so that a power controller 10 and a first switch module 11 electrically connected to the filter 17 can obtain a cleaner DC input power 100.

When the first switch module 11 receives the DC input power 100, the power controller 10 switches and controls a transistor Q1 and a transistor Q2 in the first switch module 11 to convert the DC input power 100 into a first high-frequency power 101. The first switch module 11 can be designed as a push-pull circuit as shown in FIG. 2 or a half-bridge or full-bridge circuit.

In actual design, the second switch module 12 is a two-way switch module electrically connected to the power controller 10 and the rechargeable battery 13, so that when the backup power is outputted from the rechargeable battery 13, the power controller 10 is switched and controlled to convert the backup power into a second high-frequency power 102. In addition to the function of receiving the second high-frequency power 102 switched and controlled by the power controller 10, the second switch module 12 is also used for charging the rechargeable battery 13 or serving as a switch for discharging the rechargeable battery 13. The way for the power controller 10 to control the charge or discharge of the rechargeable battery 13 will be described as follows.

In a design of the power controller 10, the power controller 10 detects whether or not the DC input power 100 is inputted to control the operations of the first switch module 11 and the second switch module 12, such that only one of the first high-frequency power 101 and the second high-frequency power 102 outputs power at a time. If the power controller 10 detects an input of DC input power 100 to the vehicle battery, the power controller 10 controls the first switch module 11 to switch the operation to convert the first high-frequency power 101 normally, and also controls the second switch module 12 to switch into a state of charging rechargeable battery 13. Now, the second switch module 12 will not generate an output of second high-frequency power 102, but will simply receive the DC input power 100 to charge the rechargeable battery 13. If the power controller 10 detects a stop of inputting the DC input power 100, then the power controller 10 will stop controlling the first switch module 11, and will control the second switch module 12 to switch to a state of receiving a backup power of the rechargeable battery 13, so as to control the second switch module 12 to switch to a power supplying state to operate and convert to a second high-frequency power 102.

Referring to FIG. 2 for a schematic circuit diagram of a second switch module 12 of an on-vehicle power supply device in accordance with the present invention, the second switch module 12 performs a two-way control in this embodiment. If the power controller 10 detects an input of the AC input power 100, then the power controller 10 will control a transistor Q3 and a transistor Q4 to stop the operation and electrically conduct a diode D1 and a diode D3 to drive the second switch module 12 to a state of charging the rechargeable battery 13. On the other hand, if the power controller 10 detects a stop of inputting DC input power 100, then the power controller 10 will control the transistor Q3 and the transistor Q4 to perform the operation and stop conducting the diode D1 and the diode D2, and thus the second switch module 12 will be situated at a state of receiving the backup power of the rechargeable battery 13 to convert to a second high-frequency power 102.

In addition, the isolation transformer 14 is electrically connected to the first switch module 11 and the second switch module 12 for receiving the first high-frequency power 101 or second high-frequency power 102 to perform an induction to generate a plurality of high-frequency voltages 103. Since the isolation transformer 14 adopts the design of a multi-winding isolation transformer, therefore the isolation transformer 14 can generate a plurality of high-frequency voltages 103 for different applications.

The first output unit 15 and the second output unit 16 are electrically connected to the isolation transformer 14, so that the quantity of output units in a practical application design depends on the number of high-frequency voltages 103 that can be generated by the isolation transformer 14, but the present invention has no particular limitation on the quantity of output units. The first output unit 15 further comprises a rectifier 151 and a converter 152, wherein the rectifier 151 is used for rectifying the current of the high-frequency voltage 103 to convert to a temporary DC voltage 104, and the converter 152 is a DC/AC converter electrically connected to the rectifier 151 for converting the temporary DC voltage 104 into an AC output voltage 105 with a frequency equal to that of utility power. The second output unit 16 further comprises a rectifier 161 and a voltage regulator 162, wherein the rectifier 161 is used for rectifying the current of a high-frequency voltage 103 received by the second output unit 16 to convert to the temporary DC voltage 104, and the voltage regulator 162 is a DC/DC voltage regulator electrically connected to the rectifier 161 for regulating the temporary DC voltage 104 to a DC output voltage 106.

The first output unit 15 is electrically connected to an AC power socket 18 for outputting the AC output voltage 105 to an AC electronic device (not shown in the figure). Similarly, the second output unit 16 is electrically connected to a DC power socket 19 for outputting the DC output voltage 106 to a DC electronic device (not shown in the figure). Therefore, when a user uses the on-vehicle power supply device 1, the user can receive a power supply regardless of whether or not the car is operated at a power supplying state, and thus the user can continue using the electronic device. In addition, the on-vehicle power supply device 1 is connected and exposed, and thus the user can have the required power supply anytime and anywhere.

Figure 3:
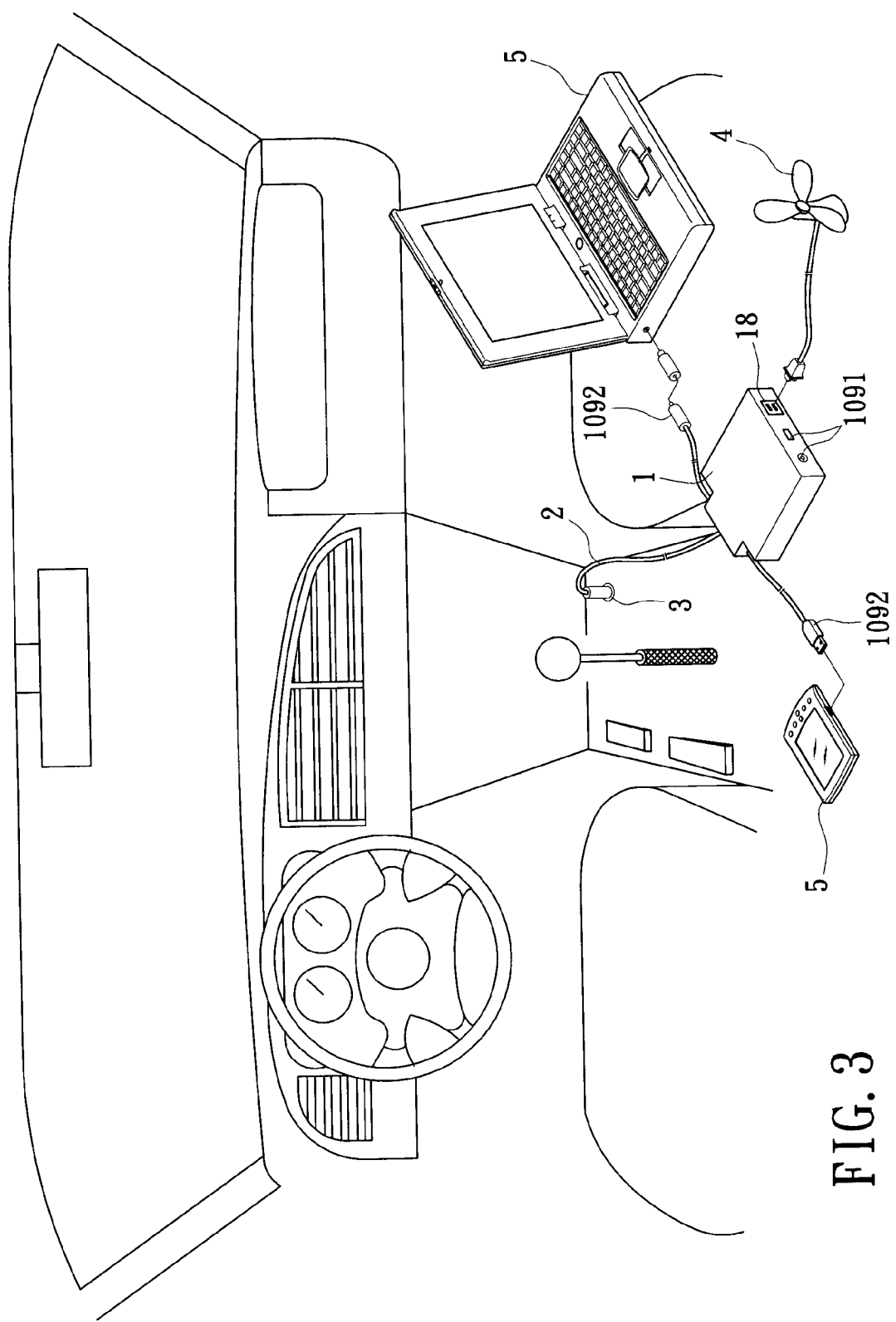
FIG. 3 is a schematic view of an application of an on-vehicle power supply device in accordance with the present invention.

Referring to FIG. 3 for a schematic view of an application of an on-vehicle power supply device in accordance with the present invention, the on-vehicle power supply device 1 is connected to a cigarette lighter 3 in a car through a cigarette lighter cable 2, and the on-vehicle power supply device 1 provides an AC power socket 18 for connecting an AC electronic device 4 (such as a small fan) as well as a DC power socket 19 designed with a fixed DC socket 1901 and a cable connecting DC plug 1902, wherein the difference between the fixed DC socket 1901 and the cable connecting DC plug 1902 resides on that the fixed DC socket 1901 is fixed onto a casing of the on-vehicle power supply device 1, and the cable connecting DC plug 1902 is extended out of the casing of the on-vehicle power supply device 1 through an extension cord. In addition, the fixed DC socket 1901 and the cable connecting DC plug 1902 can be designed as a universal serial bus jack (USB jack) and/or a direct current jack to facilitate users to connect an appropriate DC electronic device 5 (such as a personal digital assistant or a notebook computer). With the design of the cable connecting DC plug 1902, the present invention allows passengers at the backseats of the car to obtain power easily. It is noteworthy to point out that the cable connecting DC plug 1902 can be an attachable DC plug for connecting various plugs of different sizes and specifications to fit a DC electronic device 5 having various plugs of different sizes (such as notebook computers of different brands).

In summation of the description above, the on-vehicle power supply device of the present invention can achieve the purpose of supplying power to users regardless of whether or not a car is in a state of supplying power. In addition, the invention provides a DC power output and comes with a design to fit different DC power plugs, so that users in a car can waive the inconvenient use of an AC/DC adapter for the DC electronic device when the DC electronic device is used, and achieve the advantageous effect of saving space in a car.

Although the present invention has been described with reference to the preferred embodiments and related drawings thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An on-vehicle power supply device, comprising:
    a first switch module, for receiving a direct current (DC) input power supplied by a vehicle battery, and converting the DC input power into a first high-frequency power;
    a rechargeable battery, for storing and supplying a backup power;
    a second switch module, containing a first transistor and a second transistor and being a bi-directional switch module, electrically connected to the rechargeable battery for receiving the backup power, and converting the backup power into a second high-frequency power;
    a power controller electrically connected to each of the first switch module and the second switch module, for detecting the DC input power to control operations of the first switch module and the second switch module, in order to ensure either the first high-frequency power or the second high-frequency power is outputted at a time, and for switching a state of the second switch module according to whether the DC input power is provided from the vehicle battery;
    an isolation transformer, electrically connected to the first switch module and the second switch module, for receiving the first high-frequency power or the second high-frequency power to produce a plurality of high-frequency voltages;
    at least one first output unit, electrically connected to the isolation transformer, for receiving the high-frequency voltage, and converting the high-frequency voltage to an alternating current (AC) output voltage;
    at least one second output unit, electrically connected to the isolation transformer, for receiving the high-frequency voltage, and converting the high-frequency voltage to a DC output voltage; and
    a filter electrically connected to the power controller and the first switch module, for suppressing noises of the DC input power at the instant moment of starting a car engine;
    wherein when the power controller detects an input of the DC input power, the power controller is configured to turn off the first transistor and the second transistor of the second switch module so that the rechargeable battery is charged by the DC input power when the first switch module converts the DC input power into the first high-frequency power, or otherwise turn on the first transistor and the second transistor so that the second switch module receives the backup power from the rechargeable battery DC input power before the second witch module converts the backup power into the second high-frequency power.

2. The on-vehicle power supply device of claim 1, wherein the first switch module is a push-pull, half-bridge or full-bridge circuit.

3. The on-vehicle power supply device of claim 1, wherein the isolation transformer is a multi-winding isolation transformer for producing the high-frequency voltages.

4. The on-vehicle power supply device of claim 1, wherein the first output unit and the second output unit further include a rectifier for rectifying the high-frequency voltage to a temporary DC voltage.

5. The on-vehicle power supply device of claim 4, wherein the first output unit further includes a converter which is a DC/AC converter connected to the rectifier for converting the temporary DC voltage into an AC output voltage with a frequency equal to the frequency of utility power.

6. The on-vehicle power supply device of claim 4, wherein the second output unit further includes a voltage regulator which is a DC/DC voltage regulator connected to the rectifier for regulating the temporary DC voltage to the DC output voltage.

7. The on-vehicle power supply device of claim 1, further comprising:
    at least one AC power socket, electrically connected to the first output unit, for outputting the AC output voltage to an AC electronic device; and
    at least one DC power socket, electrically connected to the second output unit, for outputting the DC output voltage to a DC electronic device.

8. The on-vehicle power supply device of claim 7, wherein the DC power socket is a fixed DC socket or a cable connecting DC plug.

9. The on-vehicle power supply device of claim 8, wherein the DC power socket is a USB jack or a DC jack.

10. The on-vehicle power supply device of claim 8, wherein the cable connecting DC plug is an attachable DC plug for connecting plugs of different sizes and specifications.

* * * * *